US007951000B2

(12) United States Patent
Sakaguchi et al.

(10) Patent No.: US 7,951,000 B2
(45) Date of Patent: May 31, 2011

(54) DYNAMIC FRAME SYSTEM

(75) Inventors: Hironobu Sakaguchi, Honolulu, HI (US); Takahiro Kaminagayoshi, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 11/123,875

(22) Filed: May 6, 2005

(65) Prior Publication Data

US 2006/0252533 A1 Nov. 9, 2006

(51) Int. Cl.
*A63F 13/00* (2006.01)

(52) U.S. Cl. ........................................................ 463/31

(58) Field of Classification Search ...................... 463/31
See application file for complete search history.

(56) References Cited

U.S. PATENT DOCUMENTS

| 4,672,541 A | 6/1987 | Bromley et al. |
| 5,607,356 A | 3/1997 | Schwartz |
| 6,527,637 B2 * | 3/2003 | Fujioka et al. ................... 463/4 |
| 7,033,269 B2 * | 4/2006 | Namba et al. ................... 463/3 |

OTHER PUBLICATIONS

FAA Technical Center, Human Factors Design Guide, National Technical Information Service, Jan. 15, 1996, 8-55-56.*
International Search Report, International Application No. PCT/US06/16230, Dated Apr. 17, 2007.

* cited by examiner

*Primary Examiner* — Dmitry Suhol
*Assistant Examiner* — Malina K Rustemeyer
(74) *Attorney, Agent, or Firm* — Woodcock Washburn LLP

(57) ABSTRACT

A video game system and method is described in which interactive portions of a display screen are displayed with non-interactive portions having cutscenes. The cutscenes may be related to, or developed from, the events transpiring in the interactive portion of the display screen. The non-interactive cutscenes may be converted into interactive areas, and may be enlarged to take the place of the original interactive portion of the display screen. Animation effects may be used for the various transitions.

22 Claims, 15 Drawing Sheets

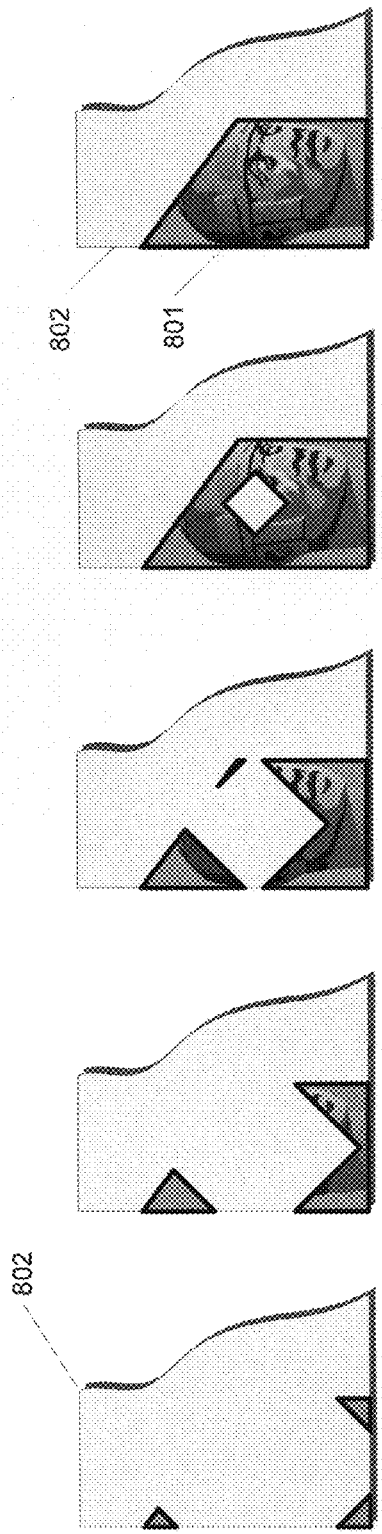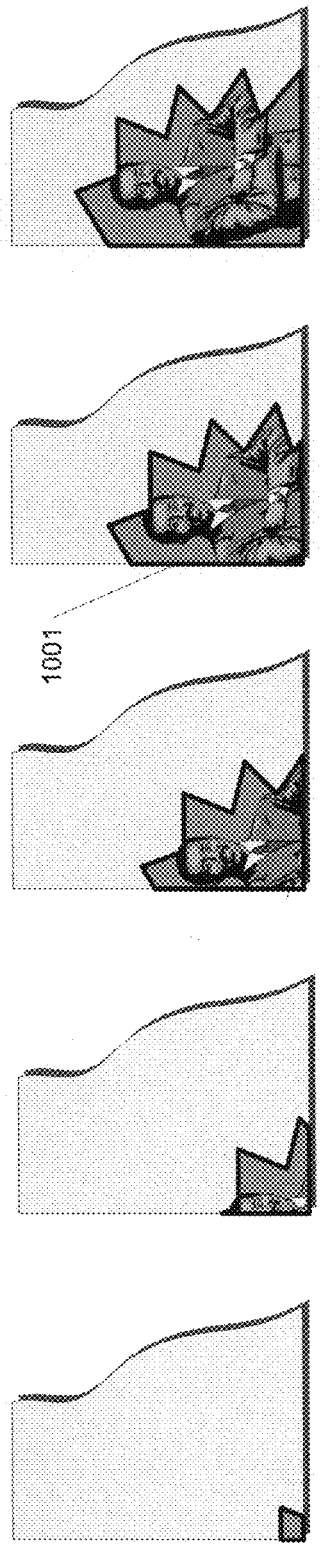

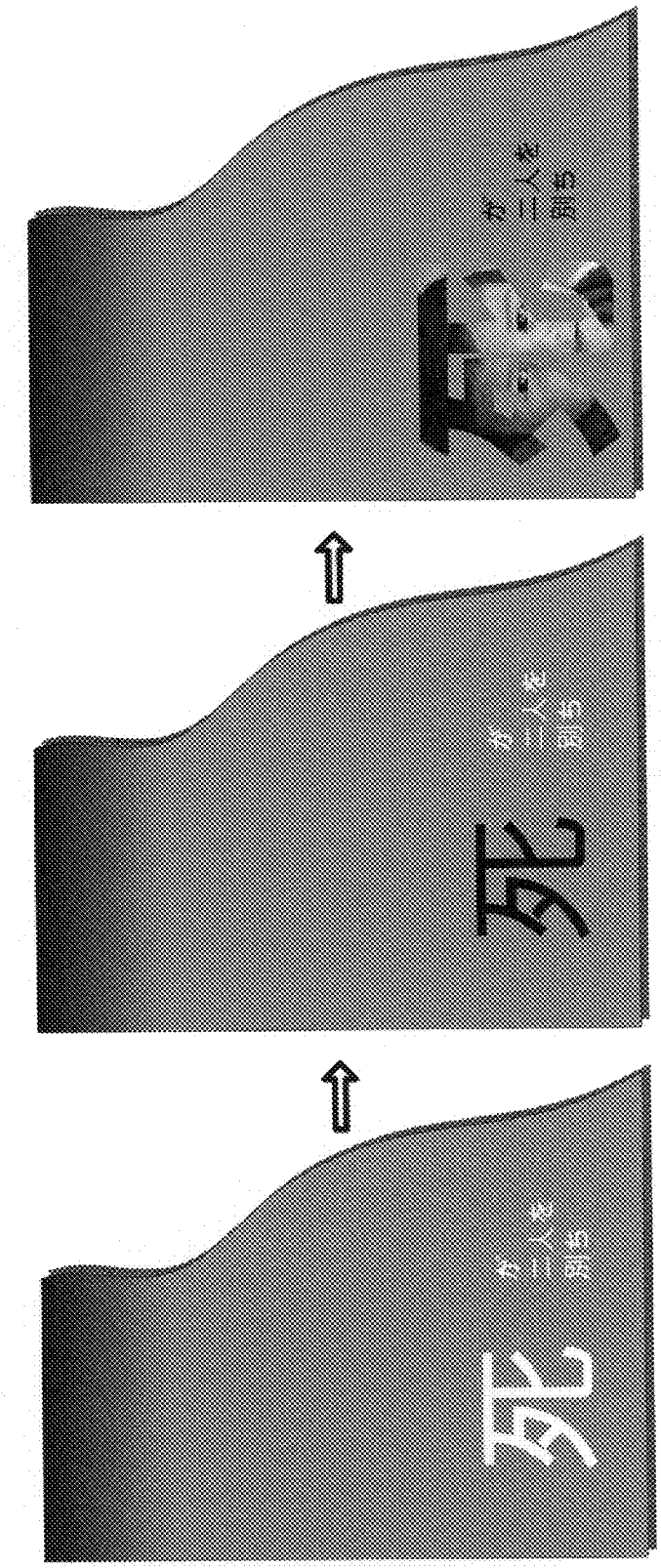

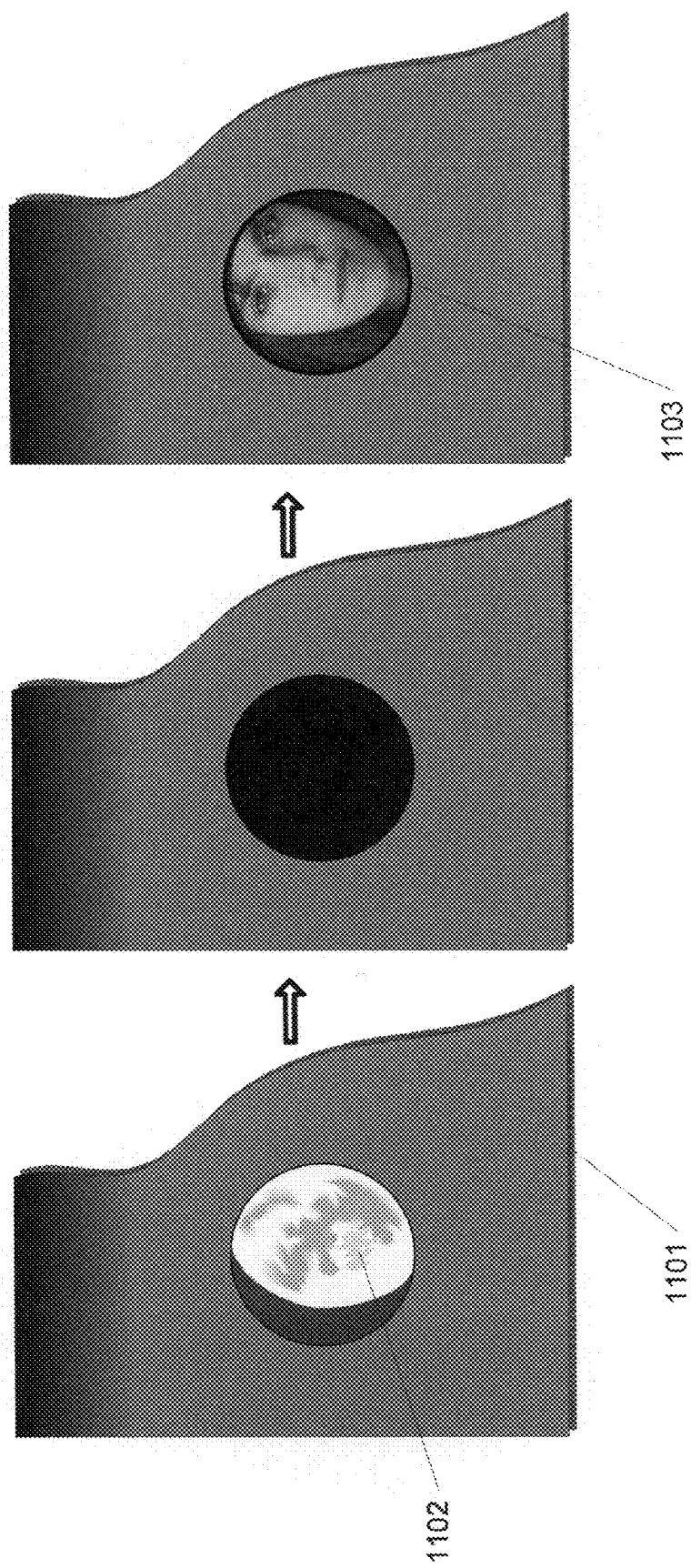

DYNAMIC FRAME SYSTEM

TECHNICAL FIELD

The present application relates generally to video game user interfaces and presentation displays. Some aspects relate to the manner in which visual images are presented to a video game user. Some aspects relate to using non-interactive cutscene images with interactive regions of a display screen.

BACKGROUND OF THE INVENTION

In many computerized role-playing games (RPGs), adventure games, action games, and the like, the user is given the ability to control the movement and actions of an onscreen character to guide the character through the game's environment. The character typically seeks to achieve an ultimate goal, such as avenging a wrong, rescuing a princess, and/or retrieving an archaeological artifact, and there is typically an underlying story that keeps the player engrossed in the game. Indeed, for many players, the story itself is the primary reason for playing.

To help present the story, many games use animated cutscenes. Cutscenes are animated scenes that are presented for viewing by the player. In the cutscene, the player no longer controls the character, and instead views a scene similar to an animated cartoon or theatrical movie. For example, upon successfully guiding the game's character through a mission, a player may be presented with an animated cutscene showing the character happily reuniting with the rescued princess.

Because cutscenes are non-interactive, a greater portion of the video game machine's (e.g., computer, console, etc.) resources can be devoted to displaying the scene. Accordingly, cutscenes often have features not found in the normal interactive portions of the game, such as higher quality animation, cinematic camera zooming, special musical score, etc. Cutscenes can be pleasant to watch, and can help present a more engaging story to the player, thereby enhancing the experience.

However, one drawback to the typical cutscene is the fact that it interrupts game play. Some players do not enjoy such interruptions, and would rather continue with the interactive portions of the game. Because some players enjoy the cutscenes, and others do not, today's game developers must strike a delicate balance between the interactive portions and non-interactive portions. Too much of one or the other, and the game risks losing the player's interest. Accordingly, there is a need in the art for a better way to strike this balance.

SUMMARY OF THE INVENTION

Aspects of the present invention provide a more dynamic approach to presenting non-playable cutscenes with the playable portions of video games. In one aspect, a game play screen may be divided into multiple portions, or frames, where one frame contains playable interactive content and the other areas display multiple non-playable cutscenes. In some aspects, one of the non-playable cutscene frames may evolve into a playable frame, such as by enlargement.

The playable and non-playable frames may be simultaneously presented to the user, and the content of the non-playable frame may be related to the character's actions in the playable frame. In some aspects, a cutscene in a non-playable frame may develop from character actions occurring in the playable frame.

In some aspects, the various frames on the screen include dynamic borders, such that frames may grow, shrink, slide, move, or otherwise change appearance dynamically as the game play unfolds. Frames may have animations that occur when appearing and disappearing, such as wiping shapes, trajectory-based appearance/disappearance, sliding, fading, etc., and may be scalable and/or animated. In some aspects, frames may take the form of a variety of shapes.

BRIEF DESCRIPTION OF THE DRAWINGS

FIGS. 8a-e illustrate a sequence of screen portions in which a frame appears.

FIGS. 10a-e illustrate another sequence of screen portions in which a frame appears.

FIGS. 11a-c illustrate a sequence of frames in which an object displayed in the frame may be replaced by another frame.

FIGS. 12a-c illustrate another sequence of frames in which an object displayed in the frame may be replaced by another frame.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
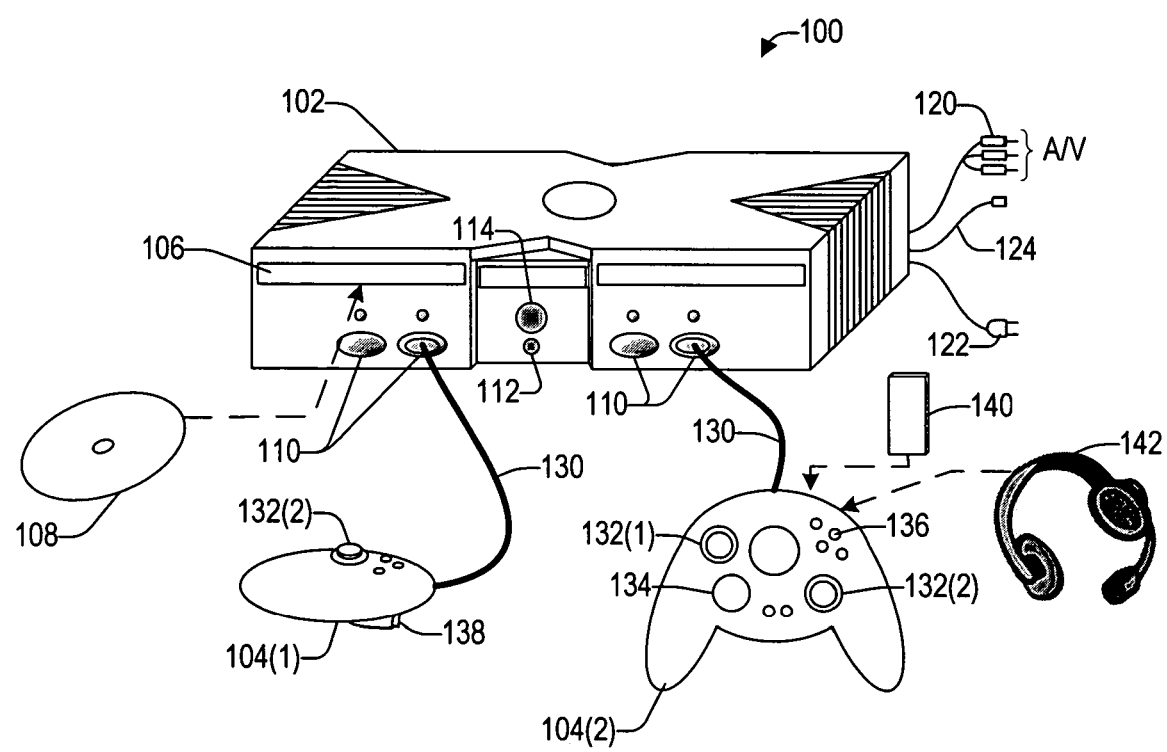
FIG. 1 illustrates a gaming system that may be used according to an illustrative embodiment of the invention.

FIG. 1 illustrates an example of a suitable gaming system environment 100 on which computer games, video games, and or other electronic games (collectively referred to herein as computer games) may be played. The gaming system environment 100 is only one example of a suitable computing environment and is not intended to suggest any limitation as to the scope of use or functionality of the invention. Neither should the gaming system environment 100 be interpreted as having any dependency or requirement relating to any one or combination of components illustrated in the illustrative operating gaming system environment 100.

Aspects of the present invention are operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

Aspects of the present invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

Game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television or other display (not shown) via A/V interfacing cables 120. A power cable 122 provides power to the game console. Game console 102 may further be configured with broadband network capabilities, as represented by the cable or modem connector 124 to facilitate access to a network, such as the Internet.

Each controller 104 may be coupled to the game console 102 via a wire or wireless interface. In the illustrated implementation, the controllers are USB (Universal Serial Bus) compatible and are connected to the console 102 via USB cables 130. Controller 102 may be equipped with any of a wide variety of user interaction mechanisms. As illustrated in FIG. 1, each controller 104 is equipped with two thumbsticks 132(1) and 132(2), a D-pad 134, buttons 136 (e.g., 'A', 'B', 'X', 'Y'), and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and user accounts, and port them for play on other consoles. In the described implementation, each controller is configured to accommodate two memory units 140, although more or less than two units may be employed in other implementations. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable medium 108 in drive 106, from an online source, or from a memory unit 140. For security, in some embodiments executable code can only be run from the portable medium 108. A sample of what gaming system 100 is capable of playing include game titles played from CD and DVD discs, from the hard disk drive, or from an online source; digital music played from a CD in the portable media drive 106, from a file on the hard disk drive (e.g., Windows Media Audio (WMA) format), or from online streaming sources; and digital audio/video played from a DVD disc in the portable media drive 106, from a file on the hard disk drive (e.g., Active Streaming Format), or from online streaming sources.

Figure 2:
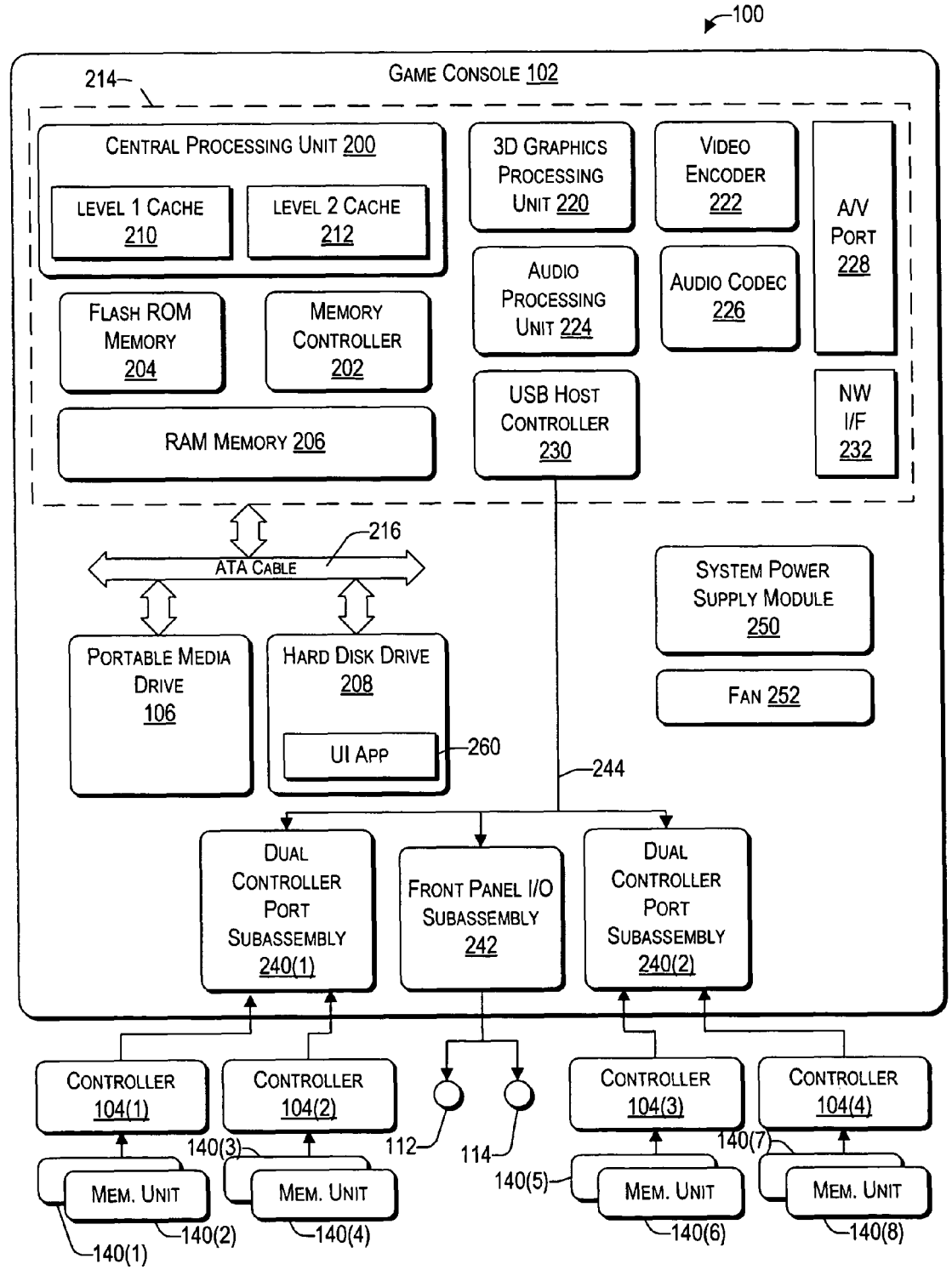
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240 (2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types-game data, audio data, and video data-regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
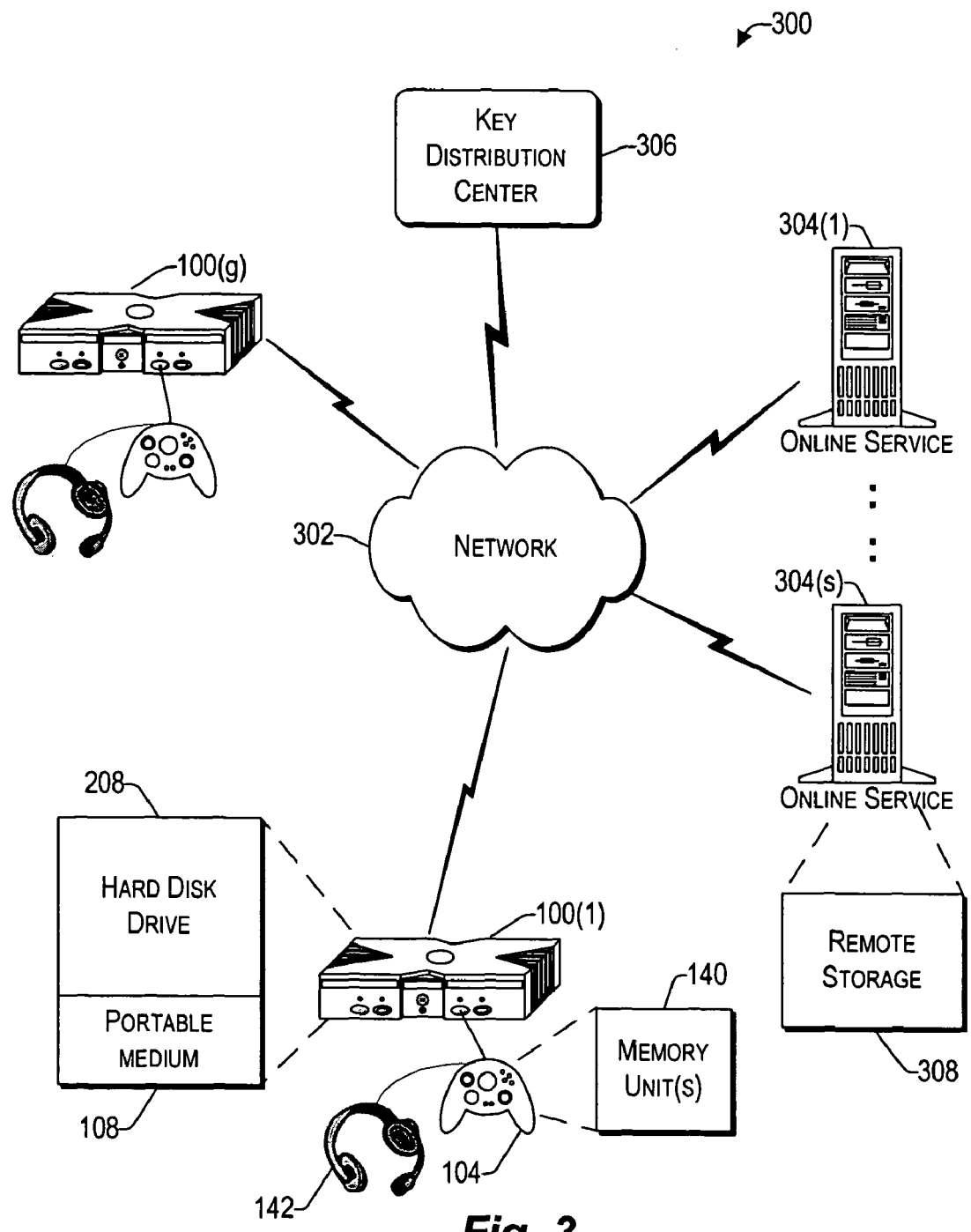
FIG. 3 illustrates a block diagram of a network gaming system according to an illustrative embodiment of the invention.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
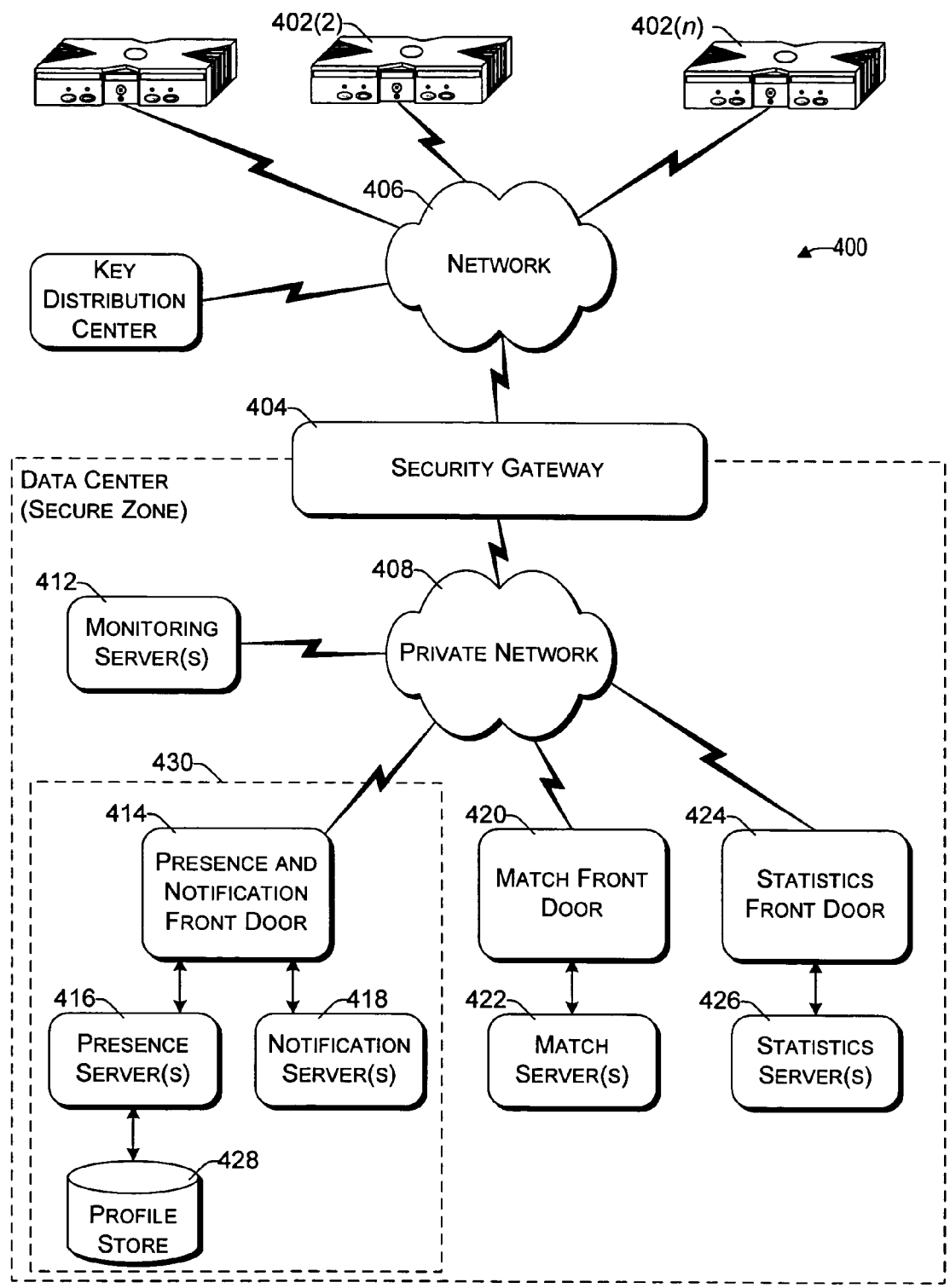
FIG. 4 illustrates another block diagram of an online gaming environment according to an illustrative embodiment of the invention.

FIG. 4 is a block diagram of another illustrative online gaming environment 400, e.g. XBOX® LIVE by Microsoft Corporation of Redmond, Wash. Multiple game consoles 402 (1), 402(2), . . . , 402(n) are coupled to a security gateway 404 via a network 406. Each game console 402 can be, for example, a game console 102 of FIG. 1 or FIG. 2. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, one or more notification servers 418, and a profile store 428 (collectively implementing a presence and notification service or system 430); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively multiple data centers may exist with which game consoles 402 can communicate. These data centers may operate independently, or alternatively may operate collectively (e.g., to make one large data center available to game consoles 102,402).

Game consoles 402 are situated remotely from data center 410, and access data center 410 via network 406. A game console 402 desiring to communicate with one or more devices in the data center logs in to the data center and establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type (e.g., a heartbeat packet).

The secure communication channel between a console 402 and security gateway 404 is based on a security ticket. Console 402 authenticates itself and the current user(s) of console 402 to a key distribution center 428 and obtains, from key distribution center 428, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device (s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

One or more aspects of the invention may be embodied in computer-executable instructions (i.e., software) stored in RAM memory 206, non-volatile memory 108, 208, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as a hard disk 208, removable storage media 108, solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as application specific integrated circuits (ASIC), field programmable gate arrays (FPGA), and the like.

Figure 5:
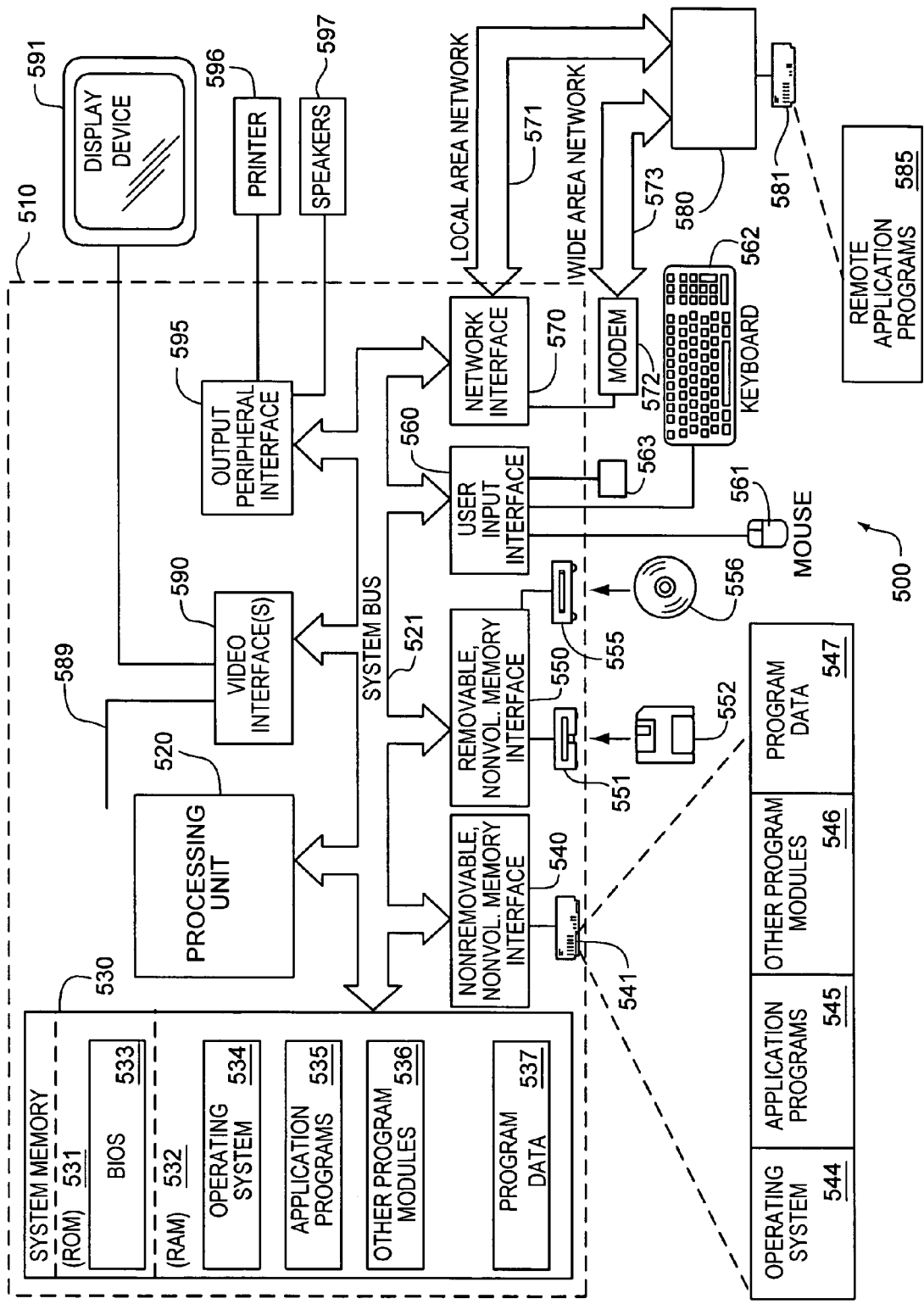
FIG. 5 illustrates a block diagram of a general computing system in which one or more aspects of the present invention may be implemented.

Aspects of the present invention are not limited to console computing environments. Indeed, these aspects may also be implemented in video games that operate on personal computers (PC). FIG. 5 illustrates an example of a suitable computing system environment 500 on which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Figure 6:
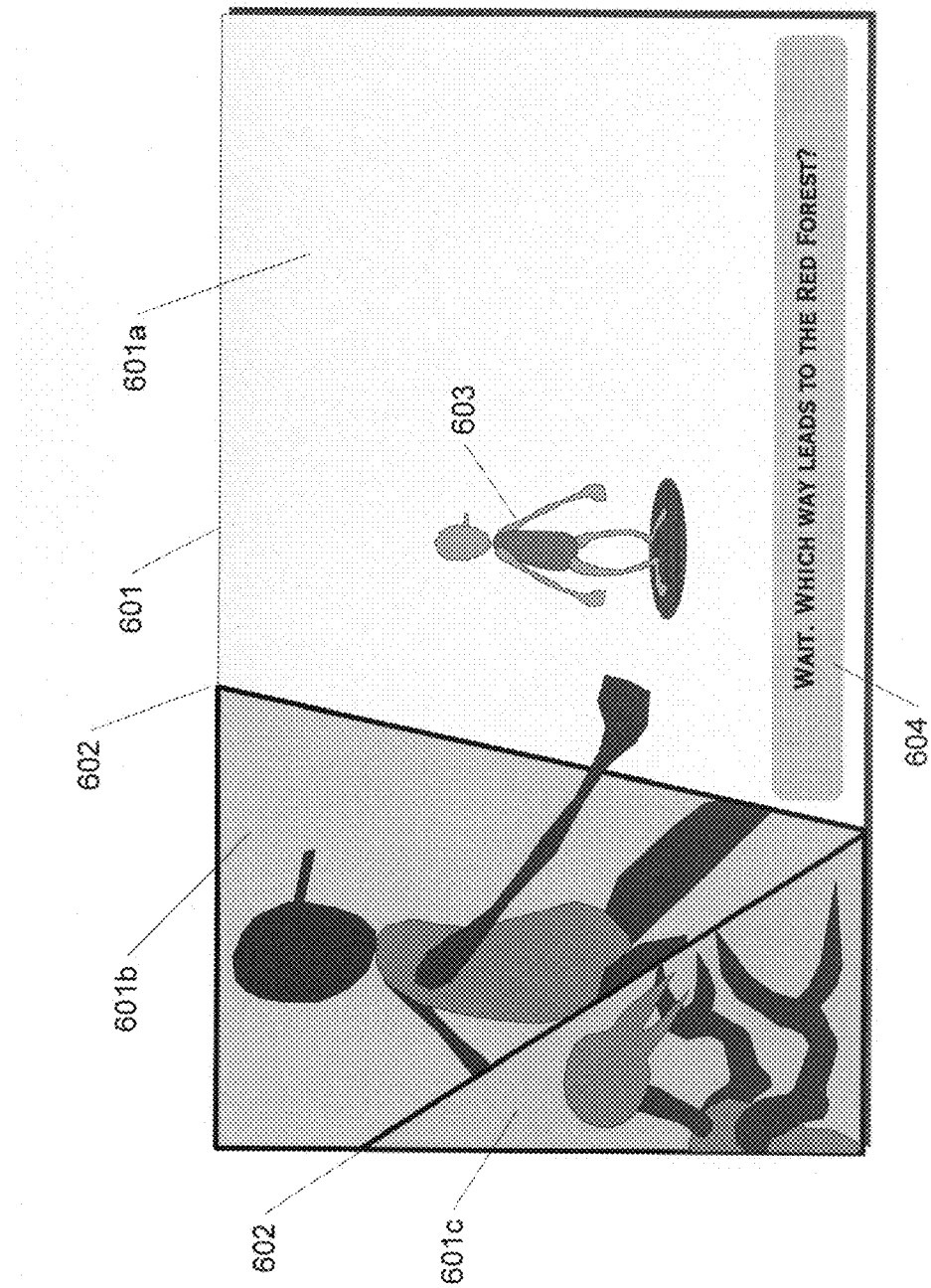
FIG. 6 illustrates an example screenshot having multiple frames.

FIG. 6 depicts an example video game screen employing several aspects of the present invention. As shown in FIG. 6, the games screen 601 may be divided into a number of distinct frames 601a, 601b, 601c by frame borders 602. Any number of frames may be used (e.g., one, two, three, four, five, six, or more) and displayed simultaneously on the player's screen. A first frame 601a, or parent frame, may be interactive, and may depict a character 603 controllable by the user. For example, the user could use controller 104(1) to direct the character's movements through, and/or interaction with, an environment depicted in the parent frame 601a. As another example, the character 603 may be a game's hero, and the user can move the hero through a town to engage in conversation with the town's inhabitants (not shown). Although a humanoid character 603 is shown in FIG. 6, the playable contents of parent frame 601a need not be humanoid in nature, as any other controllable onscreen object (e.g., animals, creatures, spaceships, vehicles, etc.) or interface may also be used.

The parent frame 601a may serve as a central area of the player's attention, and may include other elements. For example, subtitle text 604 illustrating comments, conversations, or other textual data may appear (e.g., a question may be asked by one of the characters in the story, and that question may appear as text).

Additional cutscene frames 601b and 601c may also be depicted. These cutscene frames 601b,c may each contain animated, moving video images to help tell the story of the game. For example, the frames 601b,c may include animated video footage showing two different companions as they walk together with the main character 603 controlled by the player. The cutscenes may be non-interactive, such that the user is not directly controlling the actions of the objects shown in the animation. In some aspects, the animated cutscenes may be pre-rendered video images having a higher quality (e.g., higher resolution, increased lighting effect, etc.) and/or different camera angle (e.g., zooming, panning, dynamic zooming and panning, etc.) from that shown in the parent frame 601a, so that the same object may be displayed differently in the two frames.

The animations in the cutscenes are shown as generally bounded by the borders 602 and confined to their own non-playable frames 601b,c, but it is possible to overlap into playable parent frame 601a. As shown in FIG. 6, certain animated objects appearing in the cutscene 601b may overlap a portion of the playable parent frame 601a. This kind of overlap among the frames may help tie the various frames together in conveying a story.

The images appearing in the frames 601b,c may be time synchronized to actions occurring in the parent frame 601a. For example, if character 603 stops walking, the cutscenes 601b,c may show the other characters stopping as well. Additionally, the various cutscenes 601b,c may be animated to show video images of a common scene from different points of view. For example, cutscenes 601b,c may show animated cutscenes of the same character 603, but from different viewpoints (e.g., one from a villain's point of view, another from a close-up side perspective, etc.). Having these separate frames allows game designers to dynamically set the game's tempo, time frame, viewpoints, synchronicity, etc. to present an improved experience.

Figure 7A:
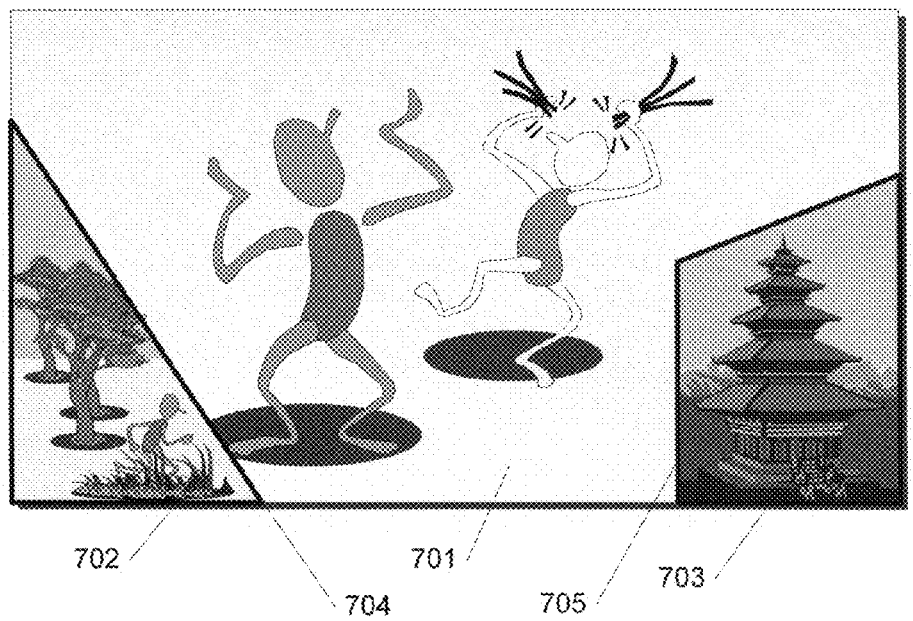
FIGS. 7a-d illustrate a sequence of screens in which one frame enlarges.

FIGS. 7a-7d depict an example sequence of screens in which a non-interactive cutscene frame can evolve into an interactive frame. This may be used, for example, when the player switches control from one character in a first location to a different character in a different location. As shown in FIG. 7a, the screen may initially include three frames 701-703 separated by borders 704 and 705. Parent frame 701 may be interactive, and may display the player's character as the player navigates it through and interacts with a first game environment (e.g., moving through a first town and pressing a button to talk to a town citizen). While the player is interacting with the parent frame 701, cutscene frames 702 and 703 may depict non-interactive, animated scenes showing, in this example, another character (e.g., a companion) walking through the woods in frame 702, and a town building in frame 703. Cutscene frames 702, 703 can depict pre-rendered animation, or alternatively, it can display in-game cutscenes that use the same graphics engines and appearances used in the parent frame 701, but are not interactive.

Figure 7B:
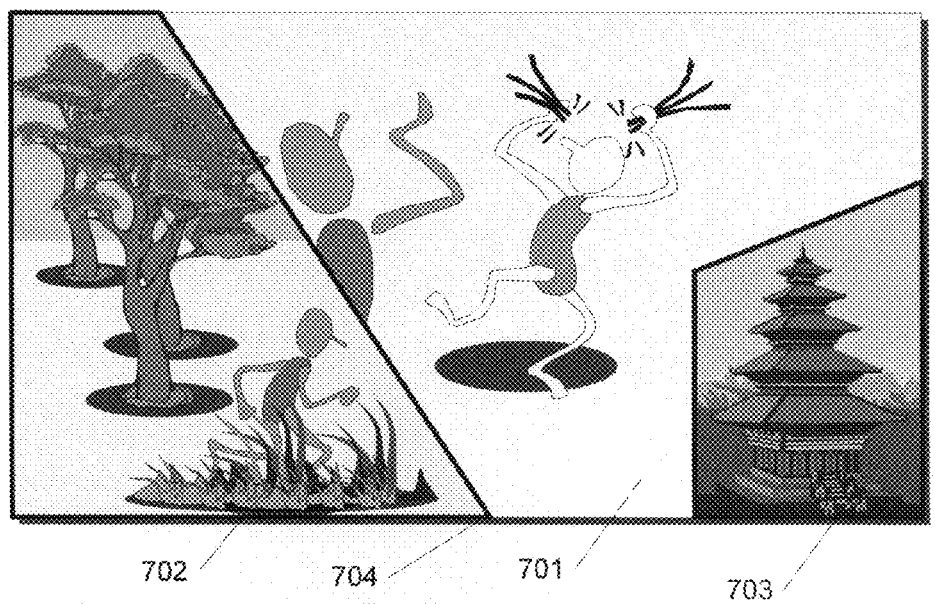

FIG. 7b depicts a subsequent screen, in which cutscene frame 702 has become enlarged by moving border 704. This enlargement may be accomplished using a smooth animation effect, in which border 704 is animated as moving across the screen. Alternatively, other effects may be used (discussed below). During this enlargement process, the parent frame 701 may continue to be interactive, and the player may still control the movement of the character displayed in parent frame 701. Alternatively, the video game program may render all frames 701-703 non-interactive during this transition, or as another alternative, the system may switch the interactivity to a different frame, such as frame 702. After the game has switched interactivity to a different frame, the player then interacts with that different frame. In the FIG. 7b example, if interactivity is switched from frame 701 to frame 702, the player's control over the character appearing in frame 701 may cease, and the player may be given instead control over characters and/or objects appearing in frame 702.

Figure 7C:
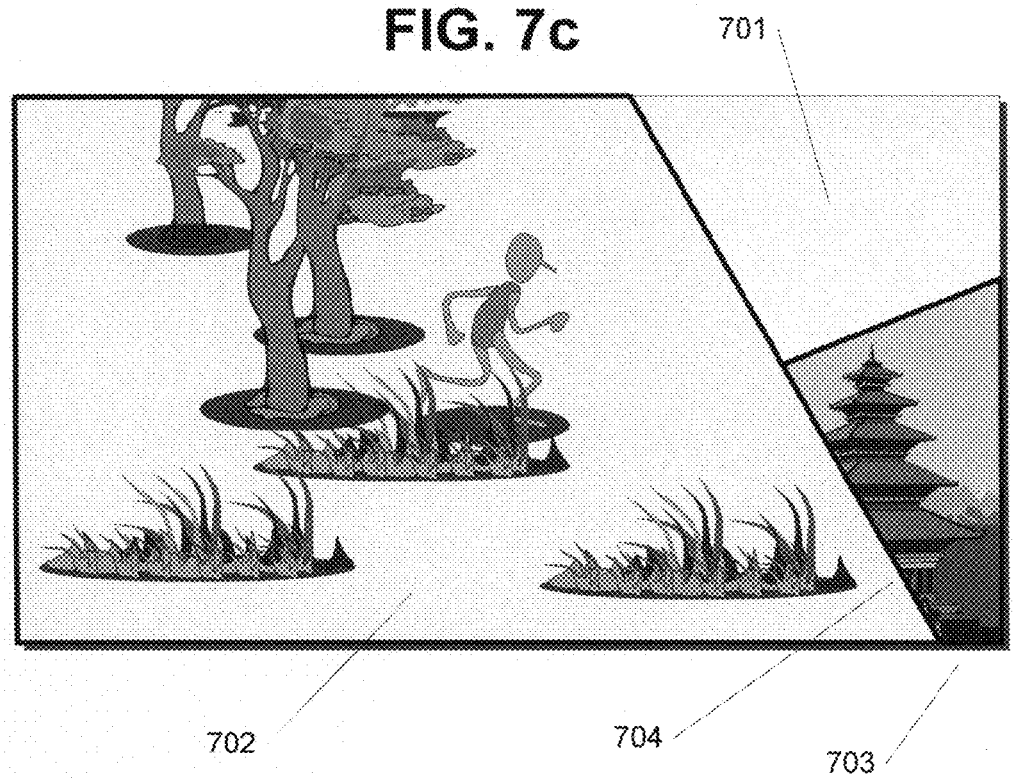
Figure 7D:
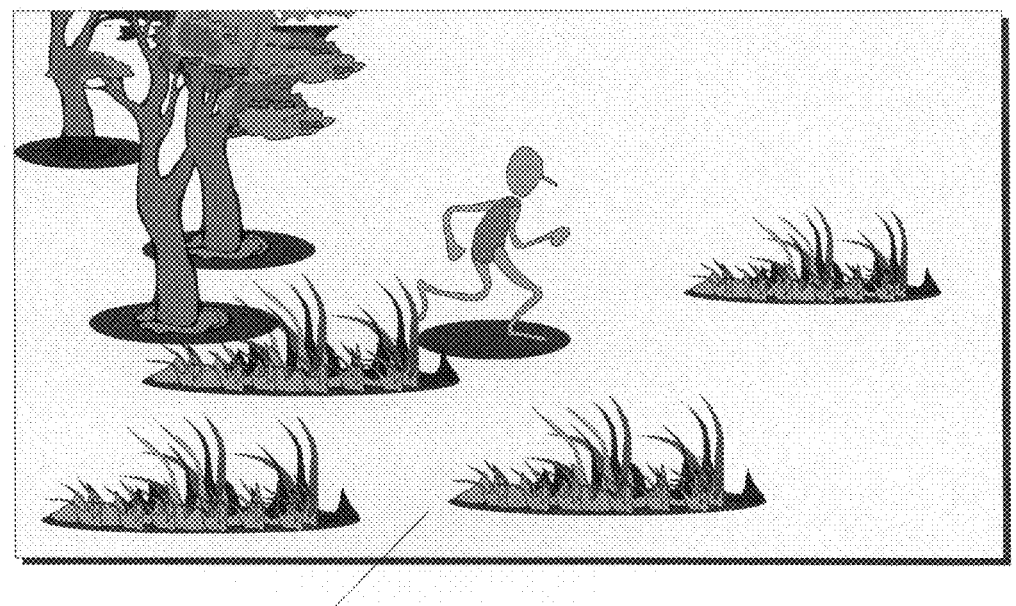

FIG. 7c depicts a further subsequent screen, in which frame 702 is even larger than before, and FIG. 7d depicts a final screen, in which frame 702 has become a full-screen frame occupying the entire display screen. In the FIG. 7d screen, interactivity has been switched from parent frame 701 to frame 702, such that frame 702 becomes the current interactive frame. The player now controls the actions of the character shown in frame 702, and can continue on with the game from that character's point of view.

As noted above, the enlargement of the frame 702 may be accomplished by a smooth animation showing the border 704 moving across the screen. This may be accomplished using a "wiping" animation effect. Other types of animations and transitions may alternatively be used to create and/or modify frames. FIGS. 8a-e show a series of screen portions in which a frame 801 appears using a closing-in effect. The closing-in effect may be based on any type of shape, such as a polygon (3-, 4-, 5-, 6-, 7- etc. sided closed shape), circle, free-hand drawing, hollowed-out letters, leaf, raindrop, etc., and its shape need not necessarily be related to the shape of the new frame (although it can be, if desired).

Figure 9:
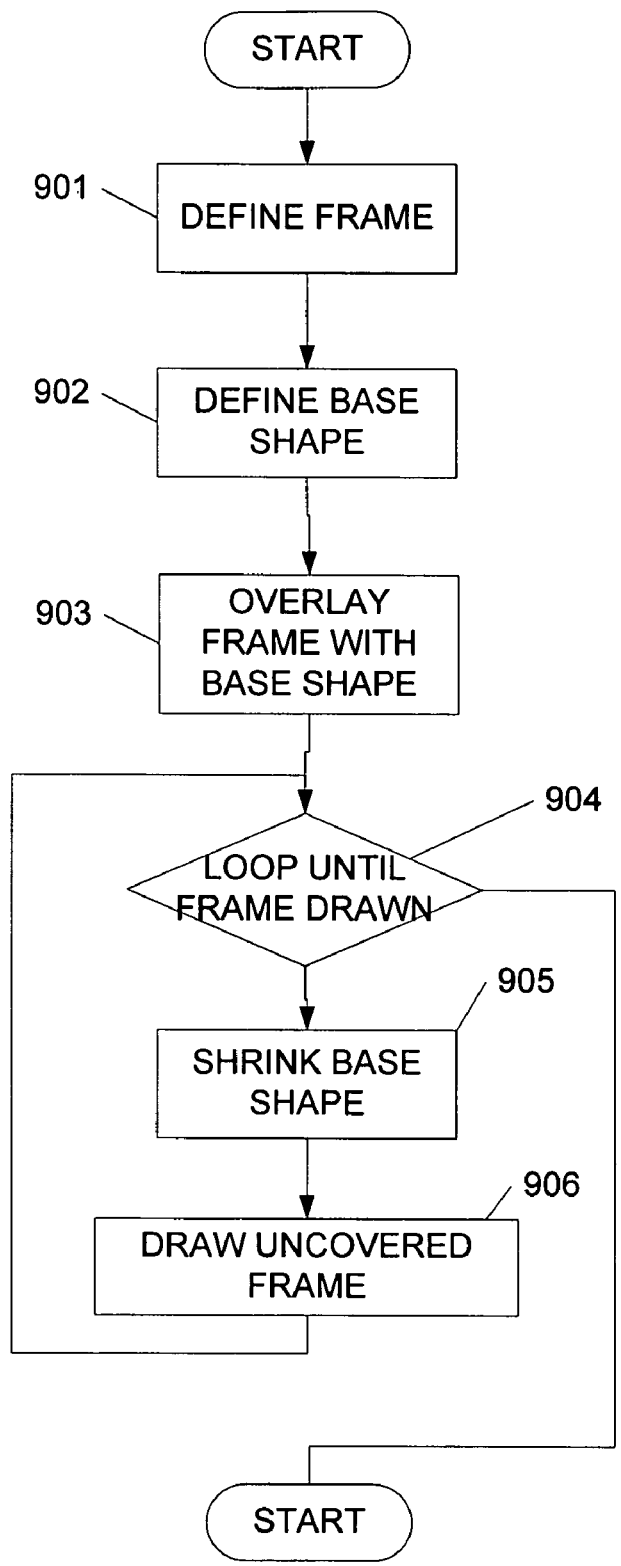
FIG. 9 illustrates an example process by which a frame may appear.

The closing-in effect may be accomplished in a variety of ways using graphics algorithms and video memory techniques. FIG. 9 depicts an example flow diagram for creating this effect. The process may begin in step 901 with the definition of the frame that is to be added. This definition can occur when the original game code is written, or it may be determined dynamically during game play. The definition may, but need not, result in the immediate generation of the final frame in a video memory. When the frame is defined, the base shape is then defined in step 902. This definition can also occur during game development, or dynamically during game play. The base shape is the shape that will initially obscure the new frame, but which will shrink away to reveal the new frame.

In step 903, the new shape is sized to overlay and obscure the entire new frame. Obscuring the new frame does not necessarily require that the new shape also obscure portions of adjacent frames. For example, the original, large diamond shape obscuring the frame in FIG. 8a need not obscure portions of adjacent frame 802, but it may if desired. Additionally, obscuring the new frame may be accomplished by rendering or drawing the portions of adjacent frame 802 that would have appeared in the same location, such that adjacent frame 802 uses the obscured portions of frame 801.

Step 904 begins a loop that will continue until the new frame 801 is drawn. In step 905, the defined shape that obscures frame 801 will be miniaturized by a predetermined amount, such as a number (e.g., 1, 2, 3, 4, 5, 10, etc.) of pixels or millimeters on the screen. In step 906, the portions of frame 801 uncovered by the miniaturization are drawn on the screen, and the process returns to step 904 to continue to reveal process until the new frame 801 is drawn on screen.

Other types of visual effects may also be used. For example, a new frame may be dithered into place, or faded into place. Alternatively, FIGS. 10*a-e* depict another series of screens in which the new frame 1001 slides into position through animation along a predetermined trajectory, such as a straight line, a curve, etc. As also shown in these figures, frames 801, 1001 may be of any desired shape. Indeed, the shape may be defined by shapes of objects that are already displayed on the game screen. For example, FIGS. 11*a-c* depict a frame 1101 in which a moon 1102 is shown. To introduce a new frame, the shape of the moon can be replaced by a blank frame and/or obscured, and then replaced with a new frame 1103 displaying a different image (e.g., a cutscene, such as an image of a person's face as shown). This process may result in the hollowing out of the selected shape, and subsequent replacement by the new frame. The new frame 1103 may then be enlarged to whatever shape is desired on the screen.

Any type of shape displayed on screen in a frame may be selected for this replacement and enlargement. For example, FIGS. 12*a-c* depict another sequence of screens in which a Japanese textual character is hollowed out and replaced by a new frame. Other shapes, such as character outline, environmental objects, etc., may also be selected for this hollowing out transition.

Figure 15:
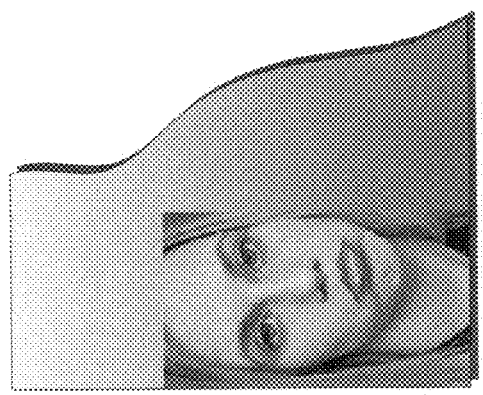
FIGS. 13-15 illustrate frames with various borders.
Figure 14:
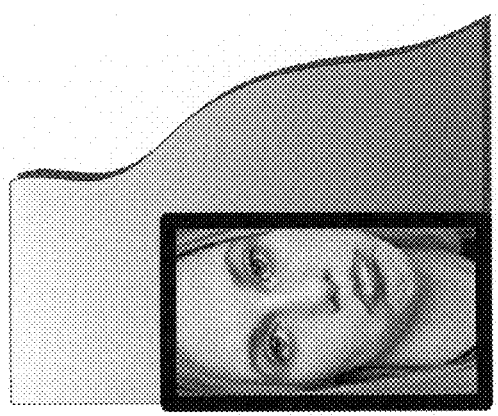
Figure 13:
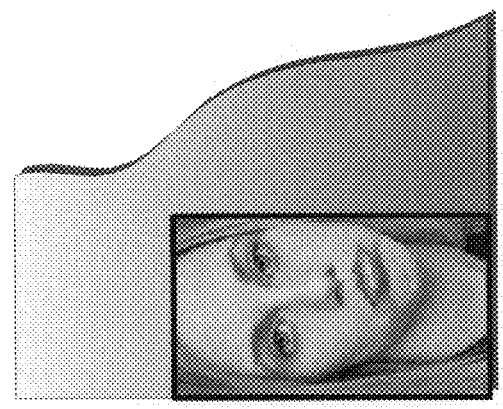

In addition to these transition effects, frames may have their borders altered as well. For example, FIG. 13 depicts a frame 1301 having a standard border 1302, while FIGS. 14 and 15 depict the frame with a thicker frame 1401 and no frame at all, respectively. Of course, other line effects may be used as well for the borders, such as color, dashed, dotted, etc. to create a border between frames. The borders also need not be straight lines, and instead can be used to create frames of any of the different shapes noted above for the transitions.

Figure 16:
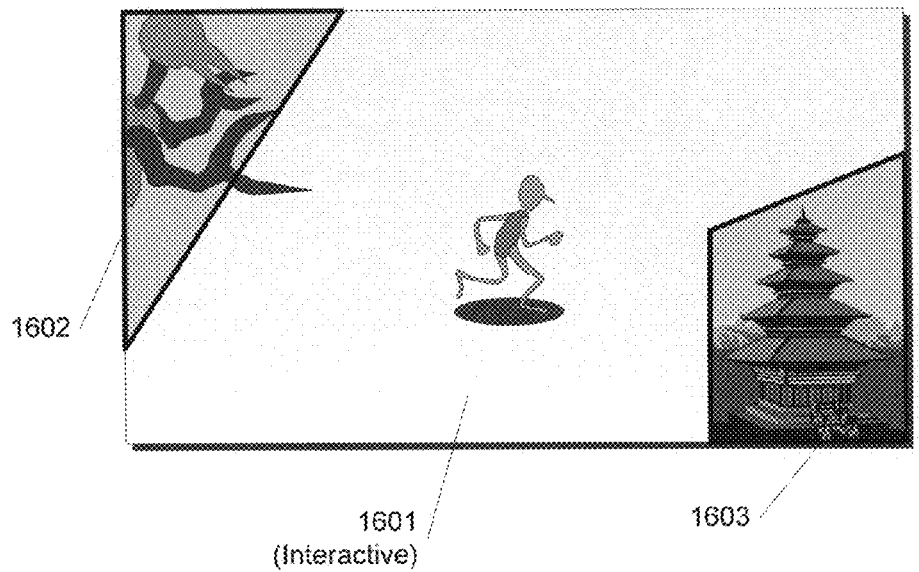
FIGS. 16-18 illustrate another sequence of screens showing several aspects of the present invention.
Figure 17:
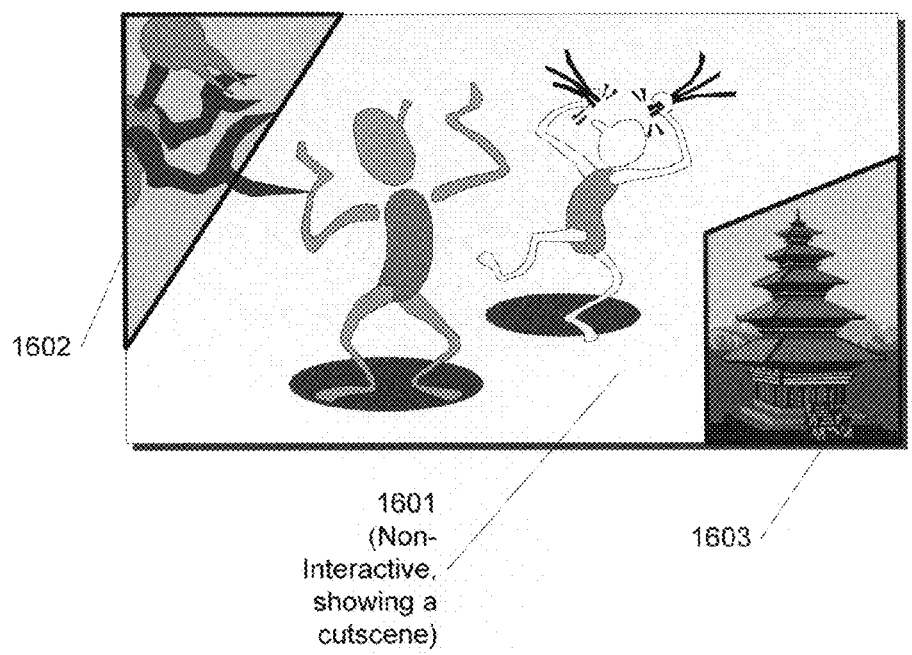

The transition effects described above are just part of the way in which various frames may be related. In some aspects, the non-interactive cutscenes may initially be developed in the parent frame, such that the parent frame may itself be used for a cutscene, and the parent's cutscene may in turn develop additional cutscenes shown in other frames. FIGS. 16*a-c* depict an example sequence of screens. In FIG. 16, the player is able to control a character depicted in parent frame 1601 and interact with the environment, such as by moving the displayed character through a field map. In the initial screen shown in FIG. 16*a*, cutscenes 1602 and 1603 appear in different frames. In FIG. 17, the player's character may encounter a cutscene trigger object, such as another character that triggers a cutscene, and parent frame 1601 may (at least temporarily) be converted from an interactive frame to a non-interactive one, and display a corresponding non-interactive cutscene. The cutscene shown in parent frame 1601 may develop from, and be based on, the player's actions that were taken when the frame 1601 was interactive. For example, if the player's character had approached a guard from behind, the cutscene shown in parent 1601 may show one of surprise or anger on the part of the surprised guard. Alternatively, if the players' character had approached from the front, the cutscene shown in parent frame 1601 may show the guard questioning the player's character.

Figure 18:
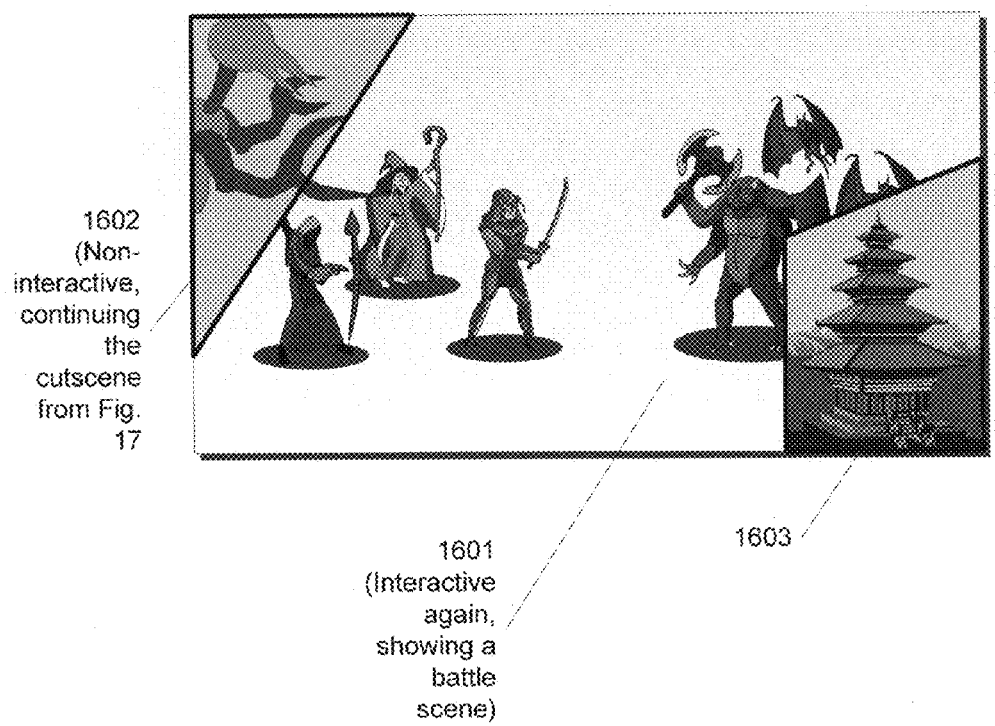

Cutscenes may also develop from other cutscenes, and may be transferred from one frame to another. As described above, the parent frame 1601 in FIG. 17 is, at least temporarily, rendered non-interactive in order to display the appropriate cutscene. This cutscene may, in turn, develop the cutscenes shown in frames 1602 and/or 1603. For example, frame 1602 may show a different view of the surprised guard. The parent frame 1601 may then be returned to an interactive frame. As shown in FIG. 18, parent frame 1601 is once again interactive, and the player is able to control the character to engage in a battle with monsters that have appeared (e.g., the surprised guard may have summoned monsters for help). Although parent frame 1601 is now engaged in an interactive battle scene, frame 1602 may continue to display the cutscene that was developed from the prior events that occurred in the parent. So, for example, frame 1602 may continue to show a non-interactive cutscene in which the guard is running away while the player's character engages in the battle shown in FIG. 18. In this manner, a first non-interactive frame having a cutscene may change to an interactive one (and vice versa), and it may transfer its non-interactive cutscene to a different non-interactive frame to continue showing the remainder of the cutscene.

The features described above are preferably encoded in computer software as executable instructions that can be executed on a computing device, such as a personal computer or video game console, to result in the display of the screens shown in the figures. Also, although various features are described above, it is not necessary to practice them all in the same embodiment. Instead, various combinations and sub-combinations may be implemented as desired, and the true scope of the present invention should only be limited by the claims that follow.

We claim the following:

1. A computer-readable medium storing on a physical object computer-executable instructions for performing the following steps:
    displaying an interactive first frame on a screen as part of a video game, the first frame including a first user-controlled character which performs volitional actions on the screen which are directly controlled by the user via a game player's controller;
    displaying a first animated non-interactive video cutscene in a second frame adjacent to the first frame as part of the video game, the first animated non-interactive video cutscene displaying a first computer-controlled character, wherein any simulated volitional action exhibited by the first computer-controlled character is directly controlled by computer programming without user intervention;
    displaying a second animated non-interactive video cutscene in a third frame adjacent to the first frame as part of the video game, the second animated non-interactive video cutscene displaying a second computer-controlled character, wherein any simulated volitional action exhibited by the second computer-controlled character is directly controlled by computer programming without user intervention;
    receiving a user command to switch the user's control via the game player's controller from the first user-controlled character to a selected one of the first and second computer-controlled characters;
    determining one of the second and third frames in which the selected one of the first and second computer-controlled characters is displayed;

converting the selected one of the first and second computer-controlled characters to a second user-controlled character and converting the determined one of the second and third frames into an interactive frame; and converting the first frame into a corresponding animated non-interactive frame, wherein the user directly controls volitional actions performed by the second user-controlled character in the determined one of the second and third frames via the game player's controller.

2. The computer-readable medium of claim 1, wherein the step of converting further includes the step of enlarging the frame displaying the selected one of the first and second animated non-interactive video cutscenes.

3. The computer-readable medium of claim 2, further comprising the step of rendering the first frame non-interactive during the step of converting.

4. The computer-readable medium of claim 1, wherein animation in the first and second animated non-interactive video cutscenes is triggered by an event occurring in the first frame.

5. The computer-readable medium of claim 1, wherein the step of converting further includes the steps of defining a shape for a closing-in effect; and closing-in the shape to reveal the cutscene.

6. The computer-readable medium of claim 1, wherein the step of converting further includes the step of sliding in the selected one of the second and third frames.

7. The computer-readable medium of claim 1, wherein the step of converting further includes the step of fading in the selected one of the second and third frames.

8. The computer-readable medium of claim 1, wherein a shape of the second frame is based on a shape of an object displayed in the first frame.

9. The computer-readable medium of claim 1, wherein the step of converting further includes the step of replacing an object displayed in the first frame with the selected one of the second and third frames.

10. The computer-readable medium of claim 9, wherein the replaced object is a textual character.

11. The computer-readable medium of claim 9, wherein the step of replacing further includes the step of hollowing-out the replaced object.

12. The computer-readable medium of claim 1, further comprising the step of transferring a cutscene between two frames.

13. The computer-readable medium of claim 1, wherein the cutscene uses a different point of view from one used by the first frame.

14. The computer-readable medium of claim 1, further comprising:

overlapping an object between borders of the first frame and the first animated non-interactive video cutscene.

15. The computer-readable medium of claim 1, the step of displaying a first animated non-interactive video cutscene in a second frame adjacent to the first frame comprising enlarging the first animated non-interactive video cutscene in response to a user action in the first frame.

16. The computer-readable medium of claim 1, wherein the first user-controlled character is displayed in the first frame simultaneously with the first and second computer-controlled characters being displayed in the second and third frames, respectively, when the user command is received.

17. The method of claim 1, wherein the first user-controlled character and the first and second computer-controlled characters are each displayed as at least one of a humanoid, an animal, a creature, and a vehicle.

18. A video game method, comprising the steps of displaying an interactive first frame on a screen as part of a video game, the first interactive frame including a first user-controlled character which performs volitional actions on the screen which are directly controlled by a user via a game player's controller;

displaying a first animated non-interactive video cutscene in a second frame adjacent to the first frame as part of the video game, the first animated non-interactive video cutscene displaying a first computer-controlled character, wherein any simulated volitional action exhibited by the first computer-controlled character is directly controlled by computer programming without user intervention;

displaying a second animated non-interactive video cutscene in a third frame adjacent to the first frame as part of the video game, the second animated non-interactive video cutscene displaying a second computer-controlled character, wherein any simulated volitional action exhibited by the second computer-controlled character is directly controlled by computer programming without user intervention;

receiving a user command to switch the user's control via the game player's controller from the first user-controlled character to a selected one of the first and second computer-controlled characters;

determining one of the second and third frames in which the selected one of the first and second computer-controlled characters is displayed;

converting the selected one of the first and second computer-controlled characters to a second user-controlled character and converting the determined one of the second and third frames into an interactive frame; and converting the first frame into a corresponding animated non-interactive frame, wherein the user directly controls volitional actions performed by the second user controlled character in the determined one of the second and third frames via the game player's controller.

19. The method of claim 18, further comprising:

overlapping an object between borders of the first frame and the first animated non-interactive video cutscene.

20. The method of claim 18, the step of displaying a first animated non-interactive video cutscene in a second frame adjacent to the first frame comprising enlarging the first animated non-interactive video cutscene in response to a user action in the first frame.

21. The method of claim 18, wherein the first user-controlled character is displayed in the first frame simultaneously with the first and second computer-controlled characters being displayed in the second and third frames, respectively, when the user command is received.

22. The method of claim 18, wherein the first user-controlled character and the first and second computer-controlled characters are each displayed as at least one of a humanoid, an animal, a creature, and a vehicle.

* * * * *